ized Patent [19]

United States Patent [19]
Manganaro et al.

[11] Patent Number: 5,266,298
[45] Date of Patent: Nov. 30, 1993

[54] PROCESS FOR REMOVING IRON FROM HYDROGEN PEROXIDE

[75] Inventors: James L. Manganaro, Princeton; Donald Gibilisco, Trenton, both of N.J.; James R. Reed, S. Charleston, W. Va.; Teresita Frianeza-Kullberg, Gastonia, N.C.

[73] Assignee: FMC Corporation, Philadelphia, Pa.

[21] Appl. No.: 993,878

[22] Filed: Dec. 23, 1992

Related U.S. Application Data

[63] Continuation-in-part of Ser. No. 935,719, Aug. 27, 1992, abandoned.

[51] Int. Cl.$^5$ .............................................. C01B 15/01
[52] U.S. Cl. .................................................... 423/584
[58] Field of Search ......................................... 423/584

[56] References Cited

U.S. PATENT DOCUMENTS 4,999,179  3/1991  Sugihara et al. ................... 423/584

OTHER PUBLICATIONS

Clearfield et al, "On the Mechanism of Ion Exchange in Zirconium Phosphates—XIII", *J. Inorg. Nucl. Chem.* 38, pp. 849–852 (1976).

*Primary Examiner*—Wayne Langel
*Attorney, Agent, or Firm*—R. E. Elden; P. C. Baker; R. L. Andersen

[57] ABSTRACT

A process is provided for removing iron from hydrogen peroxide by contacting the hydrogen peroxide with α-zirconium phosphate for up to 5 minutes at less than 35° C.

20 Claims, No Drawings

PROCESS FOR REMOVING IRON FROM HYDROGEN PEROXIDE

This is a continuation-in-part of U.S. application Ser. No. 935,719 filed Aug. 27, 1992 now abandoned.

This invention relates to a process for producing high purity hydrogen peroxide. In particular, for removing iron from hydrogen peroxide.

Specifications for high purity hydrogen peroxide ($H_2O_2$) supplied to the semiconductor industry usually call for the concentration of each cation to be less than 10 parts per billion (ppb). Current commercial high purity semiconductor grade peroxide meets these specifications. In actuality, cations such as Al, Ca, Na, Si, B, Fe, Zn or Cr are often in the 1-10 ppb range.

More stringent specifications of the semiconductor industry require peroxide solutions to contain <1 ppb of each cation and <50 ppb of each anion. Iron (Fe) is a particularly critical contaminant to semiconductor manufacturers and is desirably controlled as far as possible below 1 ppb.

The use of ion exchange resins to purify hydrogen peroxide solutions is taught by U.S. Pat. No. 2,676,923. It employed a sulfonated styrene-divinylbenzene polymer ion exchange in the acid form to remove metals from peroxide solutions. The heavy metal (Fe, Cr, Cu etc.) content absorbed from solution onto the resin is not to exceed 1% of the theoretical ferric ion binding capacity of the resin to avoid catalytically decomposing the hydrogen peroxide.

A later patent (U.S. Pat. No. 3,297,404) discloses removal of anions from hydrogen peroxide by means of quaternary ammonium substituted styrene-DVB resin in the bicarbonate or carbonate form. The $HCO_3$ or $CO_3$ ions rather than OH or Cl ions are preferred.

Even soluble organics are removed by contacting hydrogen peroxide with either a weakly basic anion resin in the salt form (U.S. Pat. No. 3,305,314), a cation resin already in equilibrium with ions in $H_2O_2$ (U.S. Pat. No. 3,387,938) or a macroreticular resin without any functional groups (U.S. Pat. No. 3,531,463).

On the other hand, organic ion exchange resins can contribute impurities. For example, U.S. Pat. No. 4,792,403 teaches organics can be removed from hydrogen peroxide by contacting with a halogen-containing porous resin. However, U.S. Pat. No. 4,999,179 discloses that some halogen ions are leached from the resin and teaches that it is necessary to subsequently treat the hydrogen peroxide with an anion resin to remove the undesired halogen ions.

U.S. Pat. No. 1,275,765 teaches that a suspension of finely divided aluminum hydroxide will stabilize hydrogen peroxide, but that the stabilizing effect ceases if the precipitate is filtered from the solution.

On the other hand, PCT Application No. WO 90/11967 discloses that a dispersion of stannic oxide, a known stabilizer for hydrogen peroxide, will reduce the concentration of iron in hydrogen peroxide if the stannic oxide is first dispersed as a 0.1% to 5% slurry by means of a high shear mixer. The slurry is then distributed into a solution of hydrogen peroxide to adsorb transition metal ions (e.g. iron), and the impurities are subsequently removed by filtering the slurry from the hydrogen peroxide. However, the process requires a series of batch steps, including filtering a colloidal or semi-colloidal dispersion of stannic oxide, metastannic acid. Further, the process is not very effective in removing iron, requiring four separate 30 minute treatment cycles to reduce iron from 30 ppb to 7 ppb.

The present invention overcomes the disadvantages of the prior art processes by providing a process to remove ferric iron ions from hydrogen peroxide comprising contacting the hydrogen peroxide with α-zirconium phosphate for up to 5 minutes thereby removing at least part of the iron from the hydrogen peroxide. The process is particularly desirable as it avoids adding metal ions to the hydrogen peroxide and can be carried out at temperatures of 0° C. to 35° C., preferably at 10° C. to 25° C.

It is well known that zirconium and hafnium have more similar chemical properties than any other two elements and that zirconium compounds always contain some hafnium unless specially purified for atomic energy purposes. About 1% to 10% of the zirconium content of ores can be hafnium. As used to describe this invention the term "zirconium" will be used in conformity with standard commercial practice to include zirconium-hafnium mixtures. The α-zirconium phosphate of the present invention, $Zr(HPO_4)_2 \cdot H_2O$, is also known as zirconium bis(monohydrogen phosphate) and is commonly abbreviated as α-ZP. The compound α-ZP with a 0.87 nm spacing is distinguished from the compound $ZrNaH(PO_4)_2 \cdot 5H_2O$ which has 1.18 nm spacing between the zirconium layers. The latter compound is known to exchange larger ions and can be processed to a sufficiently large size to be useful as an ion exchange medium; however, this compound is undesirable in that it releases sodium ions into the solution. Although the sodium-free α-ZP is known to have some ion exchange capability it was not known until now to be capable of reducing the concentration of ferric iron to less than 1 ppb in hydrogen peroxide.

Zirconium phosphates, including α-ZP are known to have some ability to remove ions from solution. According to Clearfield et al., "On the Mechanism of Ion Exchange in Zirconium Phosphates-XIII," J. Inorg. Neucl. Chem., 38, pp. 849-852 (1976), it was necessary to equilibriate divalent transition ions (Cu, Ni, Co) for 14 days at 25° C. Even then the behavior of divalent nickelous ion was anomalous. In view of this unpredictability it was unexpected to find that trivalent ferric ions could be removed from hydrogen peroxide within five minutes at temperatures of less than 50° C., preferably at room temperature.

Solutions of hydrogen peroxide differ from ordinary aqueous solutions in many ways; they are unstable when heated, they decompose to form oxygen, and they are more acidic than aqueous solutions. Because of the increased rate of decomposition with increased temperature, it is desirable to maintain hydrogen peroxide solutions in the temperature range of 0° C. to 50° C. It is particularly desirable to maintain hydrogen peroxide solutions at temperatures of 5° C. to 35° C. and preferably 10° C. to 25° C.

As α-ZP is made by boiling zirconium salts in concentrated phosphoric acid, it is not unexpected that phosphate ions may be released when hydrogen peroxide is contacted with α-ZP. It is well recognized that such phosphate ions can be optionally removed by contacting the hydrogen peroxide with an anion exchange resin after contacting the α-ZP. Similarly, it is within the scope of this invention that the hydrogen peroxide can also be contacted in any sequence with cation or anion resins or with resins of polymers without functional groups, such as a microreticulated resin. Likewise, one skilled in the art will realize that longer contact times than 5 minutes, although unnecessary, will be effective.

A suitable α-ZP is commercially available from Magnesium Elektron, Inc. as a fine powder, the particles being about 0.030 mm in diameter. The α-ZP can be contacted with the hydrogen peroxide in any convenient manner, such as by slurrying with hydrogen peroxide and subsequently being removed by filtration, or by passing hydrogen peroxide through a thin bed of α-ZP equivalent to a precoat on a filter or a short, loosely packed column. A particularly preferred method of use is to apply a coating of α-ZP with short, inert fibers, such as cellulose, polypropylene, fluoroethylene polymers or the like. Alternatively, the α-ZP can be applied as a coating to resin beads with cationic or anionic functional groups, or incorporated onto microporous sheets. A coating of α-ZP on a microreticulated resin would be particularly desirable if the hydrogen peroxide contained both iron and organic materials.

Having described the best mode of practicing the invention, the following examples are presented to illustrate the unexpected efficacy of the invention and not as a limitation.

EXAMPLE 1

Alpha zirconium phosphate, from Magnesium Elektron, Inc. was loosely packed into a 1.5 cm ID polypropylene column to a depth of about 1.25 cm. A solution of hydrogen peroxide (31%) was allowed to flow through the column by gravity at a rate of about 3 ml/minute. Concentration of Fe in the feed was 2.3 ppb. The treated peroxide had an Fe level of 0.5 ppb.

Thus, zirconium phosphate is effective in removing Fe from peroxide solution to less than 1 ppb with a contact time of about 20 seconds or less. One skilled in the art will readily recognize that the α-ZP process may be combined with other treatments to remove anions, other cations and the like.

EXAMPLE 2

In a batch contact experiment 0.018 g of α-ZP was stirred in 500 ml of 30% hydrogen peroxide. After 5 minutes the α-ZP was allowed to settle and the hydrogen peroxide was decanted and filtered through a 0.45 μm Millipore (Trademark) filter. The iron content which was originally 12.9 ppb was not detectable in the product. The product contained 28 ppm phosphate ion.

We claim:

1. A process for removing iron from hydrogen peroxide consisting essentially of contacting the hydrogen peroxide with α-zirconium phosphate for up to 5 minutes at a temperature of 0° C. to 35° C. thereby removing at least part of the iron from the hydrogen peroxide.

2. The process of claim 1 wherein the hydrogen peroxide is contacted with the α-zirconium phosphate by passing the hydrogen peroxide through a bed of α-zirconium phosphate.

3. The process of claim 2 wherein the bed of α-zirconium phosphate also contains inert fibers.

4. The process of claim 2 wherein the bed of α-zirconium phosphate also contains cellulose fibers.

5. The process of claim 1 wherein the hydrogen peroxide is contacted with the α-zirconium phosphate by slurrying the α-zirconium phosphate in the hydrogen peroxide and subsequently filtering the hydrogen peroxide slurry.

6. The process of claim 1 wherein the α-zirconium phosphate is applied as a coating to resin beads.

7. The process of claim 6 wherein the resin beads are a microreticulated resin without cationic or anionic functional groups.

8. The process of claim 6 wherein the resin beads contain cationic functional groups.

9. The process of claim 6 wherein the resin beads contain anionic functional groups.

10. The process of claim 1 wherein the α-zirconium phosphate is coated onto a microporous sheet.

11. The process of claim 1 wherein the hydrogen peroxide is subsequently contacted with an anion exchange resin.

12. The process of claim 2 wherein the hydrogen peroxide is subsequently contacted with an anion exchange resin.

13. The process of claim 3 wherein the hydrogen peroxide is subsequently contacted with an anion exchange resin.

14. The process of claim 4 wherein the hydrogen peroxide is subsequently contacted with an anion exchange resin.

15. The process of claim 5 wherein the hydrogen peroxide is subsequently contacted with an anion exchange resin.

16. The process of claim 6 wherein the hydrogen peroxide is subsequently contacted with an anion exchange resin.

17. The process of claim 7 wherein the hydrogen peroxide is subsequently contacted with an anion exchange resin.

18. The process of claim 8 wherein the hydrogen peroxide is subsequently contacted with an anion exchange resin.

19. The process of claim 9 wherein the hydrogen peroxide is subsequently contacted with an anion exchange resin.

20. The process of claim 10 wherein the hydrogen peroxide is subsequently contacted with an anion exchange resin.

* * * * *